Dec. 20, 1955
G. R. TURBETT
2,727,970
GAS SHIELDED ELECTRIC ARC WELDING APPARATUS
Filed Jan. 31, 1952
3 Sheets-Sheet 1
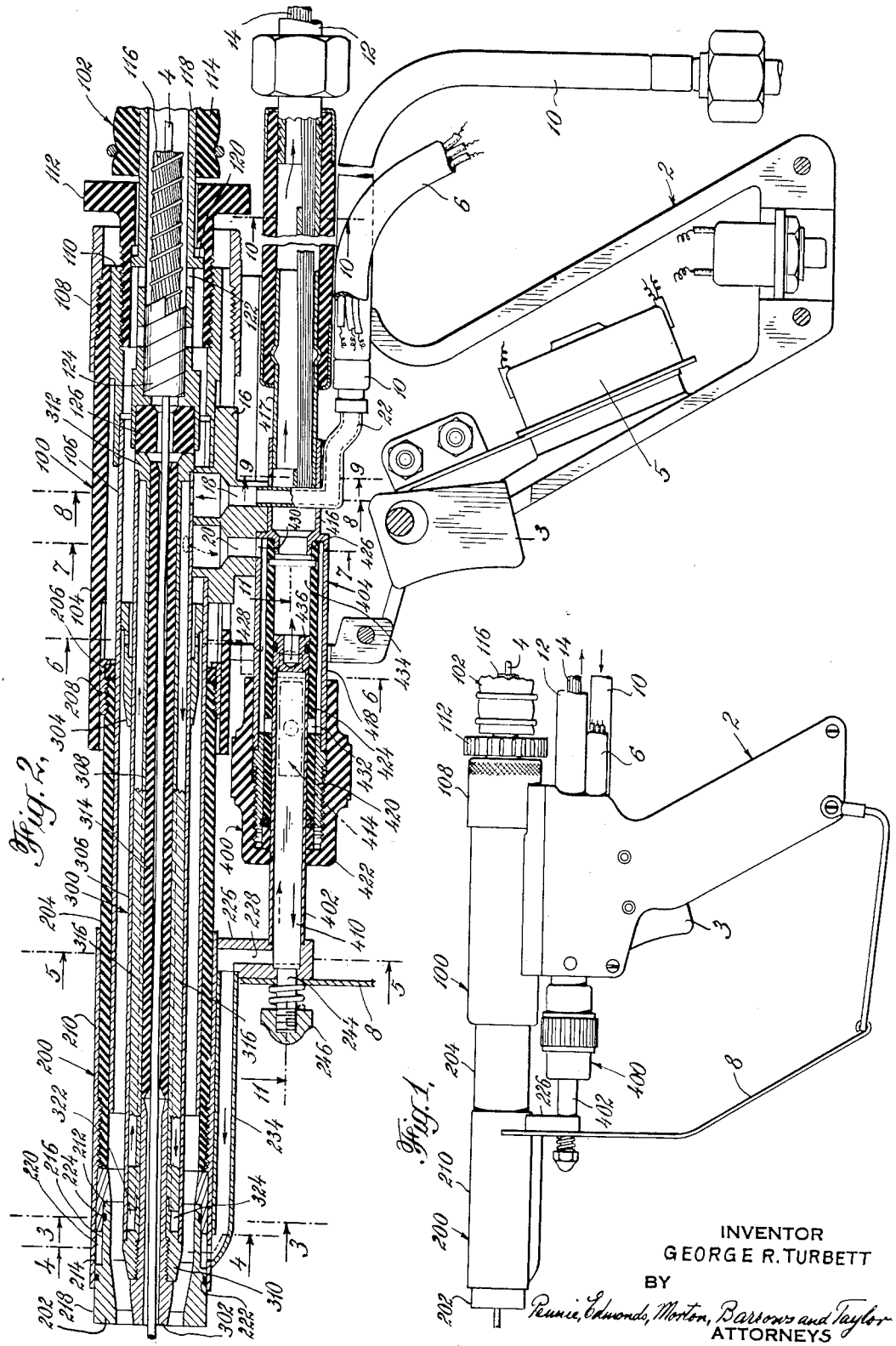
INVENTOR
GEORGE R. TURBETT
BY
Pennie, Edmonds, Morton, Barrows and Taylor
ATTORNEYS

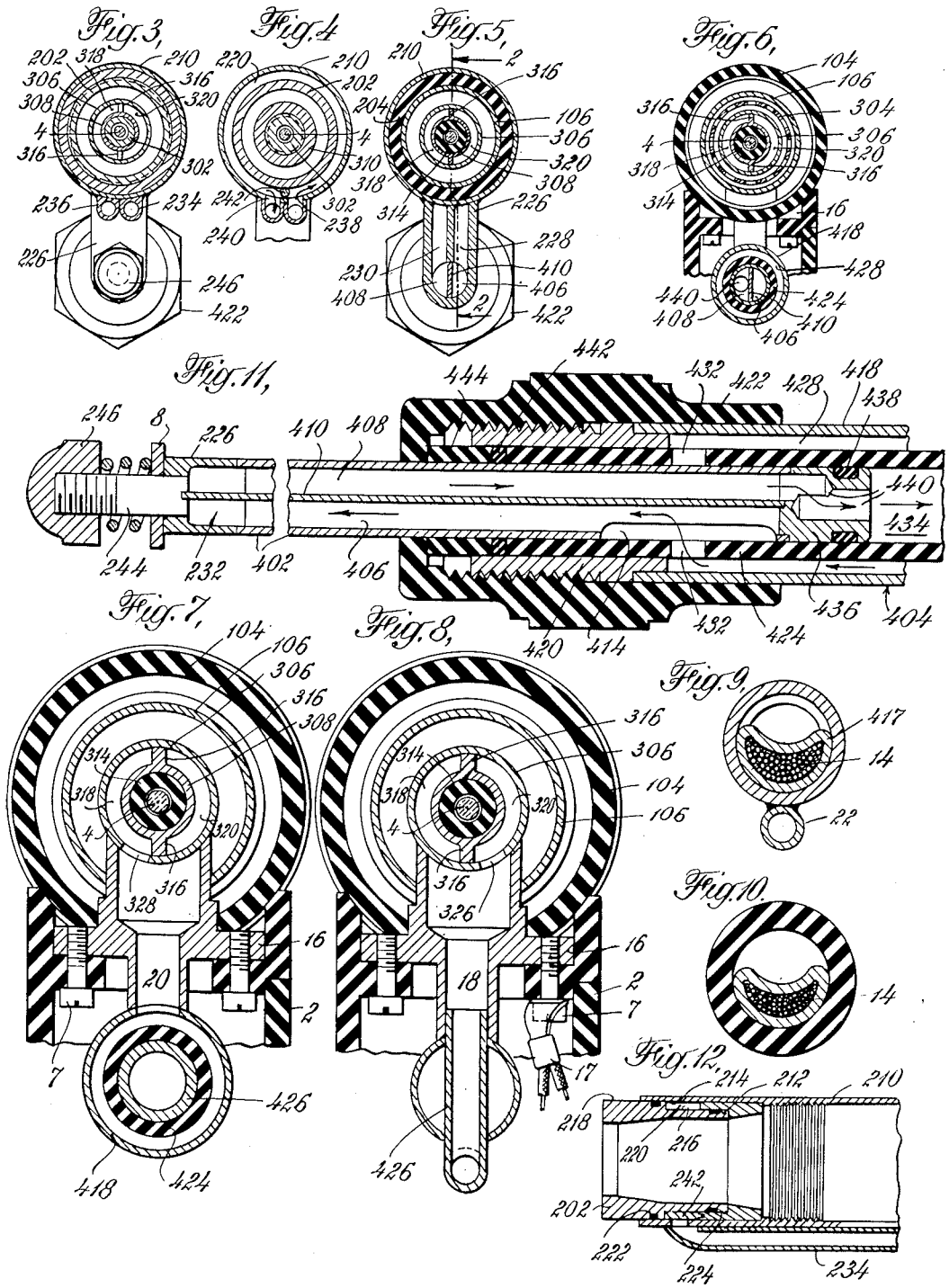

Dec. 20, 1955  G. R. TURBETT  2,727,970
GAS SHIELDED ELECTRIC ARC WELDING APPARATUS
Filed Jan. 31, 1952  3 Sheets-Sheet 3
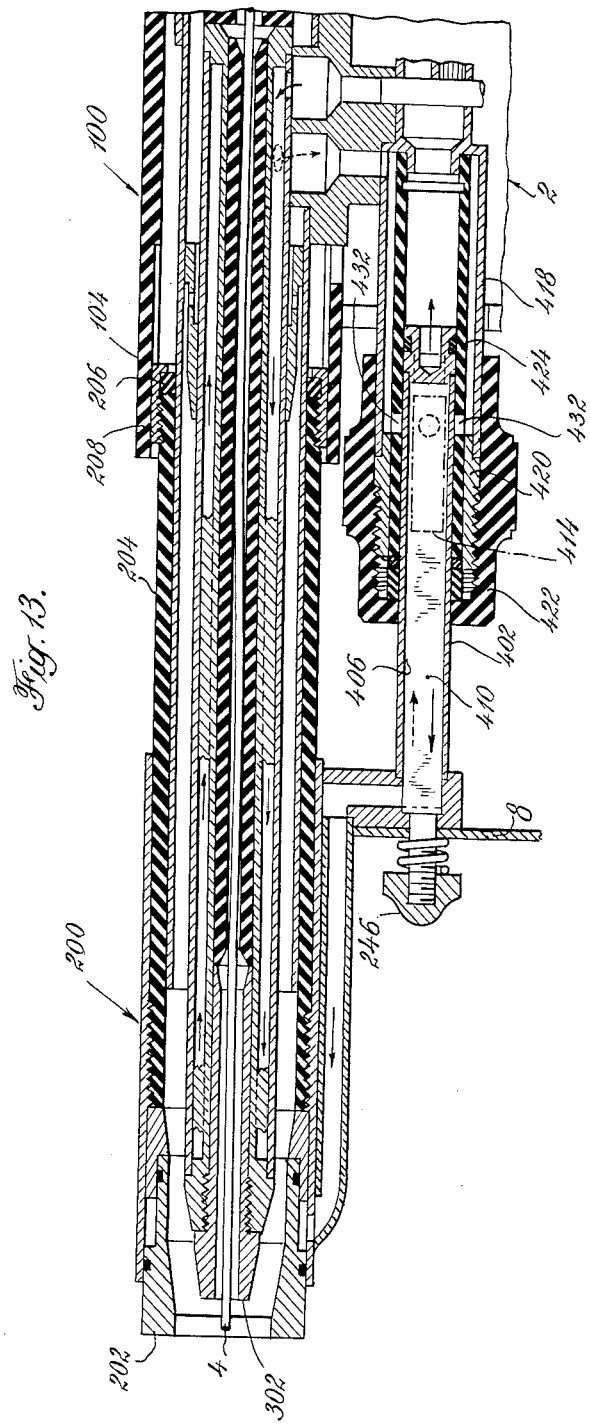
INVENTOR
GEORGE R. TURBETT
BY
Pennie, Edmonds, Morton, Barrows and Taylor
ATTORNEYS

United States Patent Office 2,727,970
Patented Dec. 20, 1955

2,727,970

GAS SHIELDED ELECTRIC ARC WELDING APPARATUS

George R. Turbett, Chatham Township, Morris County, N. J., assignor to Air Reduction Company, Incorporated, New York, N. Y., a corporation of New York Application January 31, 1952, Serial No. 269,215

25 Claims. (Cl. 219—8)

This invention relates to gas shielded metal arc welding with a consumable electrode and more particularly to water-cooled apparatus of this type for hand manipulation by an operator, such apparatus being commonly referred to as a welding gun or torch. In apparatus of this type a bare or lightly coated filler wire constituting a consumable electrode is fed to and through the apparatus held by the operator, and the arc struck between the electrode and the workpiece is shielded by an annular stream of gas, preferably an inert monatomic gas or a mixture of such gases, issuing from a nozzle about the end of the electrode. A process of gas shielded metal arc welding to the practice of which the apparatus of the invention is adapted is described in United States Letters Patent No. 2,504,868 to Muller et al., assigned to the assignee hereof. A wide variety of ferrous and non-ferrous metals may be satisfactorily welded with the apparatus of the invention.

The present invention provides a welding apparatus of this type in which the gas nozzle, and preferably the electrode support as well, are water cooled, and in which the position of the gas nozzle may be adjusted with respect to the electrode support without interruption of the flow of coolant or disassembly of the apparatus.

In gas shielded arc welding with a consumable electrode it is in general desirable to keep the gas nozzle as close to the workpiece as is consistent with good visibility for the operator, since in this way the gas shield about the arc is least exposed to interference from external air currents. Variations in welding conditions however, such as variations in the metals being welded, the size and composition of the filler wire employed, the welding position, and the value of welding current make it desirable to effect small variations in the point at which the wire fuses beyond the end of the welding current contact tube which terminates the electrode support in the gun, without changing the position of the nozzle with respect to the work. Also, in welding in confined spaces the nozzle may interfere with proper approach of the gun to the work, unless the nozzle can be retracted with respect to the contact tube. To permit such variations in the relative position of the nozzle and contact tube, it is desirable to make these two members movable with respect to each other with minimum interference to the operation of the remainder of the welding system and without prejudice to the purity of the shielding gas as it appears about the arc.

Moreover in welding with a consumable electrode, the contact tube at the end of the electrode support by which the welding current is transmitted to the electrode just prior to its presentation to the arc is subjected to severe and continuing wear and deterioration by the friction of the passage therethrough of the electrode, by the resistance heating caused by passage of the welding current from the contact tube to the electrode, and by the intense heat of the neighboring arc, and the tube must consequently be replaced from time to time. The construction of the invention permits the gas nozzle to be adjusted with respect to the contact tube as required to maintain optimum separation of the nozzle from the work and also to be retracted sufficiently to permit the tube to be seized with an ordinary wrench so that it may be withdrawn from the gun and replaced, all without the necessity of stopping the water flow or taking precautions against splashing uncooled portions of the gun with water, as would occur if the cooling system were opened.

The invention further provides a gas nozzle of readily replaceable construction in which the water jacket is formed by suitable bores and counterbores in the nozzle itself and in a metallic barrel ring into which the nozzle fits. The nozzle is held in place in the barrel ring by fillets of soft solder in circumferential grooves which may be readily softened for replacement of the nozzle as necessary.

The invention may advantageously be embodied in guns of large capacity, handling electrode filler wire up to $\frac{3}{32}$ of an inch in diameter and more at speeds of the order of 100 inches per minute and more by means of welding currents of upwards of 500 to 700 amperes. The apparatus of the invention is preferably employed in reverse polarity welding in which the electrode is made positive, although it is not restricted thereto. Of course the apparatus of the invention is not limited to the use of any particular cooling agent.

In the accompanying drawings:

Fig. 1 is a view in side elevation of a gun according to the invention;

Fig. 2 is an enlarged sectional view in elevation of the gun of Fig. 1; Figs. 3 to 11 are sectional views taken respectively on the section lines 3—3 to 11—11 of Fig. 2, Figs. 7, 8 and 11 being at enlarged scales; Fig. 12 is a detail of a portion of Fig. 2; and Fig. 13 is a partial sectional view similar to that of Fig. 2 but at an enlarged scale, showing a different relative position of the nozzle and electrode support. The section line of Fig. 2 is indicated at 2—2 in Fig. 5.

The gun of Fig. 1 includes a grip 2, a rear barrel generally indicated at 100, an inner barrel or electrode support generally indicated at 300 (Fig. 2), a front or gas nozzle barrel generally indicated at 200, and an adjustable rigid two-channel coolant connection generally indicated at 400, permitting passage of water from the grip through the inner barrel and through the gas nozzle of the front barrel for all relative positions of the gas nozzle and electrode support.

A consumable electrode 4 passes from a suitably driven supply means not shown axially down the length of the gun and emerges concentrically from the nozzle 202 for engagement with the workpiece via an arc in a manner which is now well known. The electrode enters the gun coaxially with a flexible conduit 102 through which an inert gas is fed annularly about the electrode from a suitable storage means for passage down the length of the gun to emerge concentrically of the electrode at the nozzle in order to shield the arc from the surrounding atmosphere.

The welding current, shielding gas and electrode feed are controlled by means of a trigger 3 which actuates a switch 5 (Fig. 2). Switch 5 operates, via control cable 6, suitable controls in the associated welding generator circuit, electrode feed mechanism and gas supply mechanism, not shown. The circuits employed for this purpose form no part of the present invention. A metallic guard or shield 8 may be provided between the grip and the front barrel 200 to protect the operator's hand from the heat of the arc.

Cooling water or other coolant fluid to hold the temperature of the electrode supporting tube, contact tube and gas nozzle at tolerable levels is provided to the gun at a conduit 10, and the exhaust water leaves the gun at a conduit 12 which may advantageously surround and cool the multistranded cable 14 by means of which the welding current is brought to the gun from the welding generator.

In order that the gas shield may be effective in protecting the arct from the surrounding atmosphere, the gas must emerge from the gun about the electrode with minimum turbulence, and this may be achieved at least in part by allowing the gas to flow to the nozzle and down an unobstructed annular passage having a length several times its cross section. To provide a gas passage of this shape the inner barrel is supported at a frame block 16 near the rear of the gun, to which the grip 2 is fastened by four machine screws 7 (Figs. 7 and 8), and is surrounded in coaxial relation by an inner shell 106 forming part of the rear barrel, also fastened to block 16. A conductor 17 makes connection at one of the screws 7 in order to carry electrode potential to the control circuits via cable 6. The shielding gas enters the annular space between the inner shell 106 and inner barrel so formed in a manner presently to be described, passes out through a series of radial ports in a gas diffuser 304 to correct for the disturbing effect of the frame block 16, and proceeds toward the nozzle.

At the same time in view of the very heavy welding currents employed, it is desirable to transfer the welding current to the consumable electrode as near to its point of fusion as practical. For this reason the electrode passes through a nonconducting replaceable liner 314 within the inner barrel and to a replaceable welding current contact tube 302 at the front end of the inner barrel, to emerge at the front end of the gun. The welding current passes from the cable 14 to a water outlet terminal tube 417, to which its strands are soldered as indicated in Figs. 9 and 10, and thence to the frame block 16 and down the inner and outer casings of the inner barrel presently to be described, to the contact tube.

The rear barrel includes, in addition to the inner shell 106, an outer shell or outer rear barrel 104 and suitable fittings to couple the conduit 102 to the gun. While the shell 106 is of metal, the shell 104 is of insulating material, such as a paper base phenolic product, and is affixed to the frame block 16 in coaxial relation to the shell 106 and to the inner barrel 300. Shell 106 is brazed to the block 16 while shell 104 is pinned against it by means of the grip 2. The coaxial relation of these elements is illustrated in Figs. 6, 7 and 8 as well as in Fig. 2.

The shells 104 and 106 provide between them an annular space in which the front barrel 200 has a frictional sliding fit. The shells are cut out on one side to slip over the frame block from the front, and rigidity is given to the assembly by means of rings 108 and 110.

Outer ring 108 is internally threaded to engage the exterior surface of the outer shell 104. Inner ring 110 is brazed to the inner shell 106, makes a nice fit with the inner surface of the outer shell 104, and extends up to and over the rear of the block 16 to close off the cut out portion in inner shell 106.

The ring 110 is internally threaded to take a coupling nut 112 of insulating material such as nylon on the end of conduit 102. The conduit is made up of a flexible hose 114 of rubber or similar material for the shielding gas and of a flexible armored tube 116 for guidance of the wire electrode 4. At the gun, the hose 114 is clamped to a stiff casing tube 118 which holds within the hand nut 112 at a shoulder 120. Casing tube 118 is apertured at 122 to permit the shielding gas to pass out into the space between the inner barrel 300 and inner shell 106 behind the gas diffuser 304. The electrode guide tube 116 is anchored as by brazing to the casing tube 118 at a few turns of metallic tape 124. A threaded nylon ring-shaped plug 126 is provided in a tapered hole at the front of the casing tube 118 for abutment of the casing tube assembly against the inner barrel. Nut 112 and plug 126 insulate the casing tube 118 and conduit 116 from electrical contact with the gun except via the wire electrode 4 at its contact with the contact tube 302. In this way welding current is prevented from reaching the wire electrode except at the contact tube.

The inner barrel comprises an outer casing 306, an inner casing 308, a nonmetallic replaceable liner 314, end plugs 310 and 312 which retain the casing in proper spaced relation, and the electrode contact tube 302. The inner casing 308 is provided with a pair of fins 316 seen in elevation in Fig. 2 and in section in Figs. 3, 5, 6, 7 and 8 which divide the annular space between the outer and inner casings 306 and 308 into separate cooling passages 318 and 320. The two passages of semi-circular section so formed are blocked off from each other at the rear of the inner barrel by end plug 312. At the front end the fins 316 are cut short to permit communication at 322 and 324 between the passages 318 and 320. The contact tube 302 is removably fastened by a threaded connection to front end plug 310, and extends for a substantial distance back along the inside of the inner casing to the front end of liner 314 in order to permit exchange of heat to the inner casing and to the coolant flowing within the inner barrel.

The outer casing 306 of the inner barrel is brazed to the frame block 16, and connections for the flow of coolant through the passages 318 and 320 of the inner barrel are made therethrough. To this end, the outer casing is pierced in different meridians and at axially spaced locations at inlet and outlet ports 326 and 328 (Figs. 8 and 7) to mate with bores 18 and 20 in the block 16. A nipple 22 to which the water inlet tube 10 connects forms a water inlet terminal for the apparatus and is brazed into the lower end of bore 18 for in-flow. Bore 20 directs the out-flow to the coolant connection 400 leading to the nozzle.

The coolant thus passes from inlet terminal 22 through bore 18 into passage 320 of the inner barrel, down the length of the inner barrel, through openings 322 and 324 to passage 318 and back the length of the inner barrel to emerge into bore 20.

The nozzle 202 is supported in electrical and thermal insulation from the inner barrel and from the remainder of the gun by the outer front barrel 204, made of suitable insulating material such as a resin impregnated glass fibre. To prevent aspiration of air into the stream of shielding gas passing toward the nozzle, the barrel 204 is sealed to the inner shell 106 of the rear barrel by a plastic ring 206, squeezed against the rear end of barrel 204 and against shell 106 by a retaining ring 208 screwed down over the rear end of barrel 204.

The nozzle 202 is supported from the front barrel 204 by means of a metallic barrel ring 210, to which it is soft soldered for ready replacement. The ring 210 is affixed to the barrel 204 by means of a threaded joint and includes at its forward end two counterbores 212 and 214 which provide surfaces of support for the nozzle 202 and define therewith a cooling passage for the nozzle.

The nozzle itself has two coaxial outer cylindrical surfaces 216 and 218 of diameters to match the counterbores 212 and 214 respectively. By giving to the smaller of these outer cylindrical surfaces a greater axial length than to the smaller of the counterbores, a coolant passage 220 is provided through which cooling water is circulated via the connection 400.

To fasten the nozzle to the outer barrel, the cylindrical surfaces 216 and 218 are provided with circumferential grooves 222 and 224 filled with soft solder. The nozzle is preferably made of copper and the outer barrel ring of brass. The two may therefore readily be soft soldered. This construction is separately shown in Fig. 12.

Under conditions of normal operation the soft solder link between the nozzle and outer barrel ring, exposed as it is to the opposing effects of the heat of the arc and the flow of coolant in the adjacent passage 220, remains below its fusion temperature and holds the nozzle and barrel ring together. Upon operation of the gun with insufficient coolant however the temperature of the link will be raised above its fusion point and separation of the parts will alert the operator.

Circulation of the cooling water through the passages of the gun is assured for all relative positions of the nozzle and inner barrel by the adjustable rigid two-way coolant connection 400, illustrated in detail in Figs. 2, 3 to 6 and 11. This connection includes a tube 402 fixed with respect to the nozzle, a built up tube 404 fixed with respect to the inner barrel, separate means within each of these tubes defining separate supply and return passages for the water, means rendering one passage in one tube continuous with one passage in the other, and means to prevent leakage at the junction of the two tubes.

Tube 402 is fixed at one end as by brazing to a front transfer block 226 with its length parallel to front barrel 204. Transfer block 226, similarly fixed to the front barrel ring 210, contains separate vertical bores 228 and 230 (Fig. 5) which terminate at the bottom of the block in a common horizontal bore generally indicated at 232. Bore 232 is closed to the rear of block 226 by tube 402. At their upper ends bores 228 and 230 connect with separate water tubes 234 and 236 (Fig. 3) affixed to the underside of barrel ring 210. At the front of ring 210 the tubes 234 and 236 communicate via openings or ports 238 and 240 in the ring (Fig. 4) with the nozzle cooling passage 220 on opposite sides of a barrier 242 which prevents flow between the tubes 234 and 236 except around the length of passage 220.

Tube 402 is divided lengthwise into separate side-by-side channels 406 and 408 (Fig. 11) by a meridional longitudinal partition or barrier 410. Barrier 410 extends beyond the end of tube 402 through the horizontal bore 232 in transfer block 226 and fits into a vertical slot in a stud 244, thus dividing bore 232 into separate halves to make channels 406 and 408 in tube 402 respectively continuous with bores 228 and 230 in block 226. A hand nut 246 may be threaded onto the stud 244 to retain the heat shield 8 in position. Tube 402 has an axially elongated aperture 414 cut in one side thereof adjacent its free end, in position to communicate with channel 406 only.

Tube 404 is made up of three coaxial sections 416, 418 and 420. Section 416 is brazed to the block 16 and connects with a tube 417 forming a water outlet terminal for the gun, to which the water outlet conduit 12 may be attached by suitable fittings. The central and front sections 418 and 420 of tube 404 extend into coaxial telescoping relation with tube 402, insuring transfer of the cooling medium to the latter and return. Section 420 is of smaller internal diameter than section 418 and carries a thread on its outer surface to engage with a stuffing nut 422.

To divide the interior of tube 404 into separate coolant channels, a circumferential or coaxial longitudinal barrier tube 424 is disposed coaxially therein. Tube 424 fits without unnecessary clearance over a nipple 426 formed on the front end of rear section 416 and inside front section 420, leaving an annular passage 428 between its outer surface and the inner surface of mid section 418. It also fits without unnecessary clearance over the free end of nozzle section tube 402. Bore 20 in the frame block 16 to which the coolant emerges after circulating through the passages 318 and 320, connects with channel 428 at a hole 430 formed at the rear end of mid section 418.

To permit the coolant to flow ahead from channel 428 into one of the channels of tube 402, barrier tube 424 is provided with a series of circumferentially spaced radial apertures 432. Regardless of the position of the barrier tube 424 about its own axis, one of the apertures 432 will mate with the elongated aperture 414 in tube 402, rendering the annular channel 428 hydraulically continuous with the channel 406 in tube 402. This continuity is maintained for all positions of the nozzle and front barrel axially of the gun for which the elongated aperture 414 registers with the apertures 432.

To prevent short-circuiting of the nozzle, the coolant entering the nozzle tube 402 at aperture 414 is prevented from flowing to the rear in channel 406 and out the gun via the channel 434 formed within the barrier tube 424 by means of a radial barrier block 436 affixed to the free end of tube 402. Block 436 is brazed to the longitudinal barrier 410 as well as to the circumference of tube 402 and closes channel 406 at the free end of tube 402. It also constitutes a radial or transverse barrier across the inside of the circumferential longitudinal barrier tube 424. To insure effectiveness of this radial barrier a plastic ring or grommet 438 may be provided in a groove on the outer surface of the block 436.

The barrier block 436 prevents flow from channel 428 into the inner channel 434 via apertures 432 and any clearance which may exist between the nozzle section tube 402 and the barrier tube 424.

To permit return flow of the coolant the barrier block 436 is apertured at 440 (Fig. 11) to give access between channel 408 in tube 402 and the inner channel 434 of tube 424.

A watertight seal is maintained between tubes 402 and 404 by a plastic packing ring 442 engaged between the two in the range of their telescoping overlap. The barrier tube 424 is dimensioned to leave at the free end of tube 404 a short distance to accommodate the ring 442 and a rigid gland ring 444, also slipped over the tube 402. The gland ring 444 permits the packing ring 442 to be suitably tightened into sealing contact with tubes 402 and 404 by drawing down the nut 422. The rings 442 and 444 and the nut 422 accordingly constitute a stuffing box cooperating with the barrier tube 424 to seal off the annular aperture between tubes 402 and 404. Friction developed between the ring 442 and tubes 402 and 404 is also helpful in maintaining the nozzle in a chosen position with respect to the contact tube.

To maintain the electrical insulation of the nozzle with respect to the inner barrel 300 which is at welding potential, the barrier tube 424, the packing ring 442 and the gland 444 and stuffing nut 422 are all made of nonconducting material.

The barrier block 436 may be regarded either as a means to establish continuity between channels 428 and 406 or as a means to establish continuity between channels 408 and 434. With continuity between the channels of either pair, the seal between tubes 402 and 404 insures two-way flow between the inner barrel and grip on the one hand and the nozzle on the other.

Fig. 13 illustrates the gun of Fig. 2 with a different relative position of the nozzle and electrode support. In Fig. 13 it will be observed that the front barrel generally indicated at 200, and in particular the nozzle 202 carried thereby is advanced with respect to the outer rear barrel 104 over the relative position of these elements shown in Fig. 2. Especially it will be observed that the nozzle 202 is advanced beyond the front end of the contact tube 302, whereas in Fig. 2 the end of the nozzle is flush with the end of the contact tube. Water cooling of the nozzle, as well as of the inner barrel is however maintained with the gun adjusted to the position shown in Fig. 13 as well as in the adjustment of Fig. 2. In Fig. 13, a radial hole 432 in the barrier tube 424 (which is affixed to the front transfer block of the electrode support) remains in matching relation with the elongated aperture 414 in tube 402, which is affixed to the front barrel 200 and therefore to the nozzle. Change from the position of Fig. 2 to that of Fig. 13 requires only loosening the nut 422, a pull on the front barrel 200 and retightening of the nut.

The invention has been described in terms of a preferred embodiment employing cooling of both the inner barrel or electrode support and of the nozzle and employing a serial connection between the jackets of these two members, the coolant being led first to the inner barrel and then to the nozzle. With such a serial connection of the jackets, failure of coolant to either is indicated to the operator by stoppage of the flow of coolant. A parallel connection of the jackets is also possible however, and the inner barrel may even be left without cooling consistently with the invention. Moreover in the two-channel coolant connection of the embodiment described, the tube with the meridional longitudinal barrier is affixed to the nozzle member, and the tube with the circumferential longitudinal barrier is affixed to the electrode-supporting member. A reversal of these parts if of course possible also. Other changes in construction of the apparatus may also be made within the scope of the invention as set forth in the appended claims.

The invention has moreover been described in terms of its application to welding apparatus for hand manipulation by an operator. It is however also applicable to apparatus of the so-called automatic or semiautomatic types in which a welding head through which the electrode is fed surrounded by a gas nozzle is supported on mechanism for suitable traverse with respect to a workpiece.

I claim:

1. Apparatus for gas shielded metal arc welding, comprising a support through which a consumable electrode may be fed, a shell supported coaxially about said support and defining therewith an annular shielding gas passage, a front barrel fitting in telescoping relation with said shell and axially movable with respect thereto, a water-jacketed nozzle mounted on said front barrel, and an adjustable coolant connection between said support and said nozzle.

2. Apparatus for gas shielded metal arc welding comprising a water-jacketed tubular barrel through which a consumable electrode may be fed, a cylindrical shell supported coaxially about said barrel and defining therewith an annular shielding gas passage, a front barrel fitting in telescoping relation with said shell and axially movable with respect thereto, a water-jacketed nozzle mounted on said front barrel, and an adjustable rigid two-channel coolant connection between said first-mentioned barrel and said nozzle.

3. Apparatus for gas shielded metal arc welding comprising a water-jacketed inner barrel through which a consumable electrode may be fed, spaced inner and outer tubular shells disposed coaxially to said barrel and to each other, water inlet and outlet ports to said barrel, water inlet and outlet terminals to said apparatus, an electrically nonconducting front barrel adapted to fit slidably between said shells, gas-sealing means affixed to the end of said front barrel engaged between said shells, a water-jacketed nozzle arranged on said front barrel, and an adjustable electrically nonconducting two-channel coolant connection between said nozzle and one of said ports and one of said terminals.

4. Apparatus for gas shielded metal arc welding comprising an inner barrel through which a consumable electrode may be fed, a tubular shell disposed coaxially to said barrel, inlet and outlet coolant terminals fixed with respect to said barrel, an electrically nonconducting front barrel adapted to fit slidably externally of said shell, gas-sealing means affixed to the end of said front barrel engaging said shell, gas-diffusing means disposed between said inner barrel and said shell, a water-jacketed nozzle arranged on said front barrel, and an adjustable two-channel coolant connection between said nozzle and said terminals.

5. Apparatus for gas shielded metal arc welding comprising a water-jacketed rear barrel through which a consumable electrode may be fed, a tubular shell disposed coaxially about said rear barrel, a front barrel slidably fitting externally of said shell, a water-jacketed nozzle member mounted on said front barrel, water inlet and outlet ports to said rear barrel, water inlet and outlet ports to said nozzle member, and an adjustable rigid two-conduit coolant connection between the outlet port of said rear barrel and the inlet port of said nozzle member and between the outlet port of said nozzle and a water outlet terminal fixed with respect to said rear barrel.

6. Apparatus for inert gas shielded metal arc welding comprising an inner barrel through which a consumable electrode may be fed, a nonconducting outer barrel supported coaxially about said inner barrel and defining therewith an annular gas passage, a metallic ring affixed to the end of said outer barrel, said ring having two successive counterbores formed therein, and an annular gas nozzle having two coaxial cylindrical outer surfaces of the diameters respectively of said counterbores, the smaller of said outer surfaces being of greater axial length than the smaller of said counterbores whereby upon insertion of said nozzle into said ring an annular coolant passage is defined therebetween, and soft solder seals between said outer surfaces and said counterbores.

7. Apparatus for inert gas shielded metal arc welding comprising an inner barrel through which a consumable electrode may be fed, a cylindrical shell disposed coaxially to said barrel, an electrically nonconducting front barrel externally engaged in telescoping relation on said shell, means to introduce a shielding gas to the annular space between said inner barrel and said shell, a metallic ring affixed to the end of said front barrel remote from said gas-introducing means, said ring having two successive counterbores formed therein, an annular gas nozzle having two coaxial outer cylindrical surfaces of the diameters respectively of said counterbores, the smaller of said surfaces being of greater axial length than the smaller of said counterbores whereby upon insertion of said nozzle into said ring an annular passage is defined therebetween, and low melting point metallic sealing means fused between said outer surfaces and said counterbores.

8. Apparatus for inert gas shielded metal arc welding comprising a tubular support through which a consumable electrode may be fed, a cylindrical shell coaxially surrounding said support and defining therewith an annular shielding gas passage, means to introduce a shielding gas to said annular passage at one end thereof, a front barrel slidably fitting in telescoping relation over the end of said shell remote from said gas introducing means, and a gas-sealing ring disposed adjacent the end of said front barrel engaging said barrel and shell.

9. Apparatus for inert gas shielded metal arc welding comprising a water-jacketed tubular support through which a consumable electrode may be fed, a replaceable non-metallic liner within said support, a welding current contact tube affixed coaxially to said support, coolant entrance and exit ports to said support, inner and outer cylindrical shells coaxially disposed about said support, a nonmetallic front barrel slidably engaged between said shells in telescoping relation thereto, gas-sealing means affixed to the end of said barrel engaged between said shells, a water-jacketed nozzle arranged on the end of said front barrel opposite said gas-sealing means, and an electrically nonconductive adjustable rigid two-channel coolant connection between the exit port of said support and a water exit terminal fixed with respect to said support on the one hand and separate conduits leading to said nozzle on the other hand.

10. Apparatus for inert gas shielded metal arc welding comprising an inner barrel through which a consumable electrode may be fed, a tubular shell disposed coaxially to said barrel, a front barrel slidably engaging the exterior surface of said shell, a water-jacketed nozzle arranged on said front barrel, a first tube fixed at one end with respect to said front barrel parallel thereto, a second tube fixed at one end with respect to said inner barrel parallel thereto in position to engage said first tube in telescoping relation, separate means within each of said tubes dividing the interior thereof into two lengthwise channels, means to render one channel of one of said tubes hydraulically substantially continuous with one channel of the other of said tubes, and sealing means disposed in the annular space between said tubes in the region of their telescoping relation sealing the interior of the larger of said tubes from the exterior of the smaller of said tubes outside the region of their telescoping relation.

11. Apparatus for inert gas shielded metal arc welding comprising an inner barrel through which a consumable electrode may be fed, a tubular shell disposed coaxially to said barrel, a front barrel slidably engaging the exterior surface of said shell, a water-jacketed nozzle arranged on said front barrel, a first tube fixed at one end with respect to said front barrel parallel thereto, a second tube fixed at one end with respect to said inner barrel parallel thereto in position to engage said first tube in telescoping relation, separate means within each of said tubes dividing the interior thereof into two lengthwise channels, means to render one channel of one of said tubes hydraulically substantially continuous with one channel of the other of said tubes, and a stuffing box surrounding said first and second tubes at the end of the larger of said tubes in telescoping relation with the smaller.

12. In apparatus for inert gas shielded metal arc welding comprising a tubular electrode holder member, coolant inlet and outlet terminals fixed with respect to said holder member, and a nozzle member surrounding said holder member in axially movable relation thereto to define therewith an annular gas passage about said holder member, said nozzle member including a coolant jacket having entrance and exit ports, an adjustable rigid two-channel coolant connection between said terminals and said ports comprising a first tube fixed with respect to one of said members and including an aperture adjacent one end thereof, a longitudinal partition in said first tube defining separate passages lengthwise thereof, only one of said passages having access to said aperture, a second tube fixed with respect to the other of said members and extending into telescoping relation with said end of said first tube, a third tube fitting coaxially within said second tube and extending into telescoping relation with said end of said first tube, said third tube including an aperture mating with the aperture in said first tube, one of said apertures being axially elongated, a radial barrier fixed to said first tube within said third tube, said barrier blocking access between the passage of said first tube having access to the aperture in said first tube and the interior of said third tube beyond said end of said first tube, and means to seal the annular space between said first and second tubes.

13. In apparatus for inert gas shielded metal arc welding comprising an electrode holder member, coolant inlet and outlet terminals fixed with respect to said holder member, and a nozzle member surrounding said holder member in movable relation thereto to define therewith an annular gas passage about said holder member, said nozzle member including a coolant passage having entrance and exit ports, an adjustable two-channel coolant connection between said ports and said terminals comprising a first tube fixed at one end with respect to one of said members and including an aperture adjacent the free end thereof, a longitudinal partition in said first tube defining separate passages lengthwise of said first tube, of which passages only one has access to said aperture, two coaxial tubes of which the outer is fixed with respect to the other of said members and both extending into telescoping relation with the free end of said first tube, said inner coaxial tube including an aperture mating with the aperture in said first tube, one of said apertures being axially elongated, a radial barrier affixed to the free end of said first tube and extending across the bore of said inner coaxial tube, said barrier being apertured opposite the passage in said first tube not having access to the aperture in said first tube, and means to seal the annular space between said first tube and outer coaxial tube.

14. In apparatus for inert gas shielded metal arc welding with a consumable electrode comprising a tubular electrode holder member, an electrical contact tube supported coaxially with said holder member, coolant inlet and outlet terminals fixed with respect to said holder member, and a nozzle member disposed in electrically insulated coaxially movable relation to said holder member to define therewith and with said contact tube an annular gas passage about said holder member, said nozzle member including a coolant passage having entrance and exit ports, an adjustable rigid two-channel coolant connection between said ports and said terminals comprising a first metallic tube supported at one end in fixed position with respect to one of said members and including an axially elongated aperture adjacent the free end thereof, a longitudinal partition in said first tube defining separate passages lengthwise of said first tube, only one of which passages has access to said aperture, a second metallic tube supported at one end in fixed position with respect to the other of said members and extending into telescoping relation with the free end of said first tube, a nonmetallic tube fitting with clearance within said second metallic tube and over said first metallic tube into telescoping relation therewith, said nonmetallic tube including an aperture mating with the elongated aperture in said first tube, a barrier affixed to the free end of said first tube, said barrier blocking off the passage in said first tube having access to the aperture therein from the interior of said nonmetallic tube beyond the free end of said first tube, and means to seal the annular space between said first and second tubes.

15. Apparatus for inert gas shielded metal arc welding comprising a water-jacketed inner barrel through which a consumable electrode may be fed, spaced inner and outer tubular shells surrounding said barrel coaxially thereto and to each other, an electrically nonconducting front barrel adapted to fit slidably between said shells, gas-sealing means affixed to the end of said front barrel engaged between said shells, a water-jacketed nozzle arranged on said front barrel, a first tube fixed at one end with respect to said front barrel substantially parallel thereto and having an aperture therein adjacent its free end, a longitudinal barrier in said first tube defining two lengthwise passages therein of which one communicates to the exterior of said tube via said aperture, separate conduits connecting said passages to the jacket in said nozzle, a second tube fixed at one end with respect to said inner barrel substantially parallel thereto and extending in external telescoping relation with said first tube, a tube of electrically nonconducting material of outer diameter less than the inner diameter of said second tube and of inner diameter substantially equal to the outer diameter of said first tube disposed within said second tube in telescoping relation with said first tube and having an aperture therein mating with the aperture in said first tube, one of said apertures being axially elongated, a radial barrier fixed to the free end of said first tube blocking the lengthwise passage in said first tube communicating with the aperture in said first tube and apertured to give to the other of said lengthwise passages access to the interior of said nonconducting tube beyond its range of telescoping relation with said first tube, a flexible electrically nonconducting ring disposed between said first and second tubes, means to stress said ring to seal off the annular space between said first and second tubes independently of the position of said first tube axially of said second tube, and at least one conduit connecting one of said second and nonconducting tubes to the jacket on said inner barrel.

16. Apparatus for gas shielded metal arc welding comprising a water-jacketed tubular support through which a consumable electrode may be fed, coolant inlet and outlet ports to said support, coolant inlet and outlet terminals to said apparatus, a cylindrical shell disposed about said support and defining therewith an annular shielding gas passage, a water-jacketed nozzle fitting in telescoping relation with said shell and axially movable with respect thereto, and an adjustable rigid two-passage coolant connection between said nozzle, one of said ports and one of said terminals, whereby coolant circulated between said terminals passes serially through said support and nozzle.

17. Apparatus for gas shielded metal arc welding comprising a water-jacketed support through which a consumable electrode may be fed, water inlet and outlet terminals fixed with respect to said support, a shell disposed about said support and defining therewith an annular shielding gas passage, a front barrel adapted to engage said shell in sliding telescoping relation, a water-jacketed nozzle arranged on said barrel, and an adjustable rigid double coolant connection between said nozzle and terminals.

18. Apparatus for gas shielded metal arc welding comprising a tubular support through which a consumable electrode may be fed, a cylindrical shell disposed about said support and defining therewith an annular shielding gas passage, coolant inlet and outlet terminals fixed with respect to said support, a water-jacketed nozzle fitting in telescoping relation with said shell and axially movable with respect thereto, and an adjustable rigid two-channel coolant connection between said nozzle and terminals.

19. Apparatus for gas shielded metal arc welding comprising a welding current contact member through which a wire electrode may be fed to a welding arc maintained between said electrode and a workpiece, a water-jacketed gas nozzle member surrounding said contact member in position to guide a stream of shielding gas over said arc and onto said workpiece, and adjustably fixable locking means linking said members, whereby the spacing of said nozzle member from said workpiece may be varied with respect to the spacing of said contact member from said workpiece.

20. Apparatus for gas shielded metal arc welding comprising a welding current contact member through which a wire electrode may be fed to a welding arc maintained between said electrode and a workpiece, a water-jacketed gas nozzle member surrounding said contact member in position to guide a stream of shielding gas over said arc and onto said workpiece, and an adjustably fixable link connecting said members, whereby the spacing of said contact member from said workpiece may be varied without changing the spacing of said nozzle member from said workpiece.

21. Apparatus for gas shielded metal arc welding comprising a coolant jacketed inner tubular member through which a wire electrode may be fed to a welding arc, an outer tubular member surrounding said inner member and forming therewith an annular passage through which a gas may be fed to shield said arc, and a tubular welding current contact member interfitting in heat exchanging relation with the inner surface of said inner tubular member.

22. In electric arc welding apparatus including coolant passages through which a coolant is adapted to be passed, means to indicate the flow of coolant comprising a fusible link between two elements of said apparatus, said link having a fusion point above the equilibrium temperature prevailing at its location upon operation of said apparatus with normal coolant flow and below the equilibrium temperature prevailing at its location upon operation of said apparatus with subnormal coolant flow.

23. Coolant flow indicating means for fluid-cooled electric arc welding apparatus comprising two members secured together by a fusible connection simultaneously exposed to the heat of the welding arc and subjected to the cooling action of a coolant flowing through said apparatus, said fusible connection forming a mechanical bond between said members which fuses upon arc operation for substantial time with subnormal coolant flow.

24. Coolant flow indicating means for fluid-cooled electric arc welding apparatus comprising two members, and a fusible link connecting said members, said link being located in a heat conduction path between the location of the arc produced by said apparatus and a coolant passage within said apparatus, said link having a fusion temperature above that established at its location by normal coolant flow and below that established at its location by subnormal coolant flow.

25. In apparatus for gas shielded metal arc welding comprising inner and outer barrels disposed in coaxial relation, at least one of said barrels including a coolant passage, said barrels defining an annular passage therebetween down which a stream of shielding gas may be passed, and a gas nozzle positioned coaxially in said outer barrel, a fusible link joining said nozzle and outer barrel, said link having a fusion temperature above the equilibrium temperature prevailing at its position upon operation of said apparatus with normal coolant flow through said cooling passage and below the equilibrium temperature prevailing at its location upon operation of said apparatus with subnormal coolant flow through said coolant passage.

References Cited in the file of this patent

UNITED STATES PATENTS

| | | |
|---|---|---|
| 1,707,433 | Hand | Apr. 2, 1929 |
| 2,504,868 | Muller et al. | Apr. 18, 1950 |
| 2,510,415 | Pitcher | June 6, 1950 |
| 2,544,801 | Muller et al. | Mar. 13, 1951 |
| 2,550,495 | Pilia | Apr. 24, 1951 |
| 2,554,236 | Bernard | May 22, 1951 |